Dec. 6, 1966   D. L. ANTONSON ET AL   3,290,203
TRANSPARENT AND REFLECTING ARTICLES
Filed Feb. 8, 1965

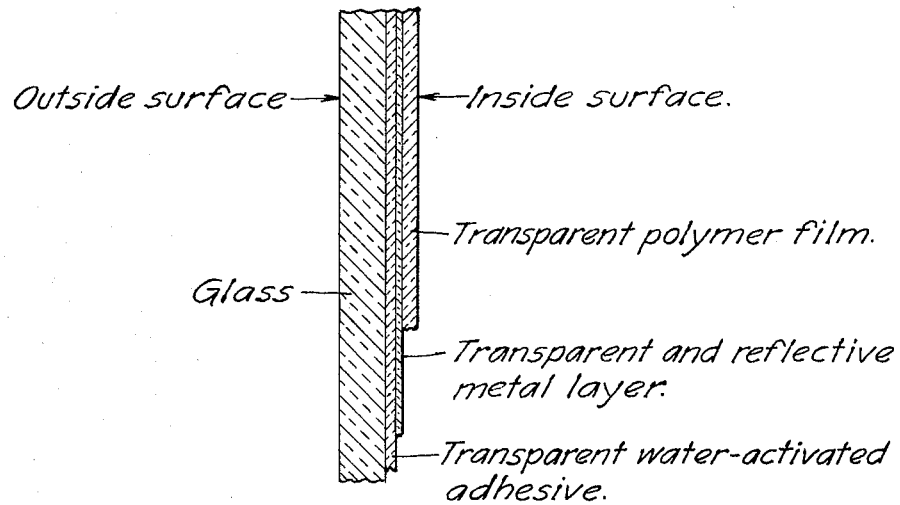

FIG. 1

Outside surface — Inside surface.
Glass
Transparent polymer film.
Transparent and reflective metal layer.
Transparent water-activated adhesive.

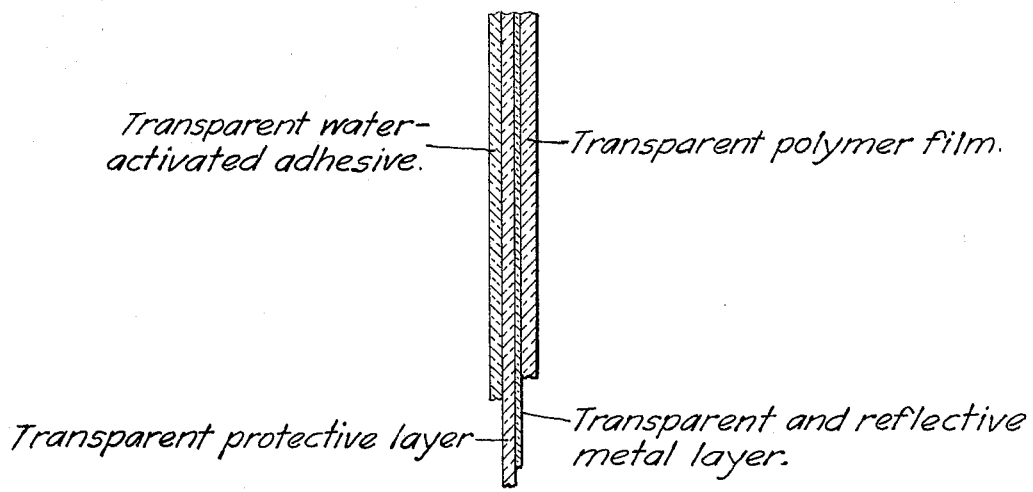

FIG. 2

Transparent water-activated adhesive.
Transparent polymer film.
Transparent protective layer
Transparent and reflective metal layer.

INVENTORS
DAVID L. ANTONSON
GERALD A. BERGER
BY Carpenter, Abbott, Coulter & Kinney
ATTORNEYS

United States Patent Office 3,290,203
Patented Dec. 6, 1966

3,290,203
TRANSPARENT AND REFLECTING ARTICLES
David L. Antonson, Woodbury Township, Washington County, and Gerald A. Berger, Maplewood, Minn., assignors to Minnesota Mining and Manufacturing Company, St. Paul, Minn., a corporation of Delaware
Filed Feb. 8, 1965, Ser. No. 430,833
10 Claims. (Cl. 161—4)

This application is a continuation-in-part of our copending application Serial No. 118,077, filed June 19, 1961, now abandoned.

This invention relates to new and useful transparent and reflective coverings for glass surfaces, such as windows. A preferred embodiment of this invention is a sheet material which when applied to the interior of a window, greatly reduces heat and glare, making the room interior more comfortable while retaining an adequate level of illumination and leaving the clarity of objects seen through the window substantially unchanged.

Although the sun provides life-giving light and heat, it frequently happens that one or both are present in annoying excess, and the problem of controlling solar radiation has plagued mankind from the beginning of time. Thus, windows have long been provided with tinted glass, venetian blinds, awnings, roller shades, louvers, drapes, coatings, etc., which absorb and/or reflect a portion of the sun's rays. Each of these techniques is effective to some extent, but each has serious disadvantages. For example, drapes, shades, blinds, and the like must constantly be adjusted as the position of the sun changes; further, such devices make it difficult, if not impossible to distinguish objects on the opposite side of the window. Pigmented coatings reduce glare, but they function principally by absorbing and re-radiating solar energy and thus fail to effectively lower room temperature. The few reflective materials available prior to the present invention have either been unsuitable for application to windows or have failed to provide a satisfactory degree of clarity. To the best of our knowledge, no one prior to our invention has ever provide a durable transparent reflective product which reduces solar energy transmission throughout the entire spectrum, which is free from undesirable distortion, which can be easily applied to any window and left in place for long periods of time, and which can be readily removed when desired. Our invention fulfills these objectives.

Our invention provides a product which reduces the transmission of ultra-violet light through a window, thereby minimizing such adverse effects as the fading of fabrics. Our novel product is particularly effective in reducing the transmission of infrared light, which is absorbed and reradiated by objects in a room. It likewise reduces the measured transmission of visible light, i.e., light in the 4,000–8,000 Angstrom unit wave length range, by as much as 80%; although heat and glare are greatly reduced, the apparent level of room illumination does not seem to be unpleasantly decreased. Without being bound thereby, we offer in possible explanation of this phenomenon, S. S. Stevens' discussion in Chapter 1 of Sensory Communication (John Wiley and Sons, Inc., New York, 1959), which states that the psychological magnitude of a physical stimulus $\psi$ is related to the physical magnitude $\phi$ by the formula $$\psi = k\phi^n$$

where $n$ varies with the type of stimulus, having the value of 0.33 for brightness of white light and 1.6 for warmth. Assuming these values to be correct, a measured reduction of 80% in light transmission affects the human eye as if light transmission were reduced approximately 40%, while a measured reduction of 80% in heat transmission affects the human body as if heat transmission were reduced over 90%.

In accordance with our invention a flexible, transparent, metallized sheet material is adhered to the inside surface of a windowpane. This sheet material is prepared by vapor depositing a thin layer of metal such as aluminum on one surface of a transparent film, e.g., a polyester film, to reduce the transmission of solar energy to the desired extent. An adhesive which is soluble in water (or aqueous alkaline solutions) is coated over the metal layer, desirably with a water-insoluble protective layer interposed between the metallic layer and the adhesive.

Polyethylene terephthalate film about 0.5 to 2 mils thick is especially useful in this invention and is preferred because of its clarity, uniformity, toughness, strength, and dimensional stability in widely varying humidity and temperature; this film is also particularly receptive to vapor-deposited metal coats. Polymeric backing films may also be formed from rigid (unplasticized) polyvinyl chloride, cellulose acetate, cellulose acetate-propionate, cellulose acetate-butyrate, polystyrene, and polybutyl acrylate, among others. The stability of these films may be improved, if necessary or desirable, by known techniques, e.g., incorporating ultraviolet ray absorbers in the film itself or, preferably, in a coating applied over the vapor-deposited metal.

Vapor coating is carried out in the conventional manner, the amount of deposited metal being measured and controlled by the reduction in light transmission of the visible spectrum, such that at least 10% but not more than about 80%, of the visible portion of the spectrum is still transmitted, as measured by a spectrophotometer such as a Beckman DK–2. This generally results in a highly reflective metallic layer on the order of 25–125 angstroms thick. Suitable metals for vapor deposition include aluminum, zinc, copper, silver, and gold.

Such water-activated adhesives as casein, hide glue, polyvinyl alcohol, or vinyl ether polymers which are soluble in neutral or alkaline solutions (e.g., vinyl methyl ether:maleic acid copolymer or the neutral ammonium salt thereof), may be employed in the practice of our invention. For most adhesives it is highly desirable to provide a transparent water-insoluble protective coating between the metal surface and the adhesive to prevent corrosion of the very thin metal layer. The protective layer should be at least thick enough to minimize annoying interference patterns, e.g., on the order of 10,000 angstroms or more, the upper limit of thickness being determined by economy, clarity, and convenience. Where such protective coatings do not firmly bond to the adhesives, suitable priming techniques may be employed; well known techniques as electrical discharge, ultraviolet irradiation and primer coatings (e.g., polyisocyanates) may be applied over the protective coat under appropriate circumstances. Adequacy of adhesion can be determined by hand-laminating a strip of conventional normally tacky and pressure-sensitive adhesive tape to the water-activatable adhesive surface and stripping it off quickly; if no "picking" occurs, adhesion is considered satisfactory. Alternatively, the finished product may be applied to a glass surface and removed after 16 hours; failure of a satisfactory product should occur either between the film and the metal vapor coat or by tearing of the film.

Our invention will be further illustrated by the accompanying drawing, which is not to scale and is for purposes of illustration only.

FIGURE 1 is a view in cross-section of a windowpane prepared in accordance with our invention, and FIGURE 2 is a view in cross-section of a preferred embodiment of our novel solar energy reducing sheet material.

Our invention will be further illustrated by the following specific examples:

Example 1

Biaxially oriented polyethylene terephthalate film having a thickness of 1 mil was metallized by vapor depositing aluminum on one surface until the film's measured ability to transmit visible light had been reduced 20%. In other words, the film retained 80% of its original ability to transmit the visible portion of the sun's spectrum. The metallized surface of the film was coated by squeeze roll with a 5% solution of butadiene:acrylonitrile elastomer ("Hycar 1011," a product of B. F. Goodrich Chemical Co.) in a 50:50 mixture of methyl ethyl ketone and toluene, dried at 150° F., and exposed to an ultraviolet light source (2537 A.), which effected a bond between the elastomer and the vapor-coated film. One part of a transparent, light-stable pigment (Holland Flush Permanent Green "FS-865") dispersed in 150 parts of a polybutyl methacrylate-nitrocellulose vehicle (Du Pont clear lacquer 1234) and 50 parts of toluene, was applied to the surface of the elastomer in a quantity equal to 1.25 milligrams per square centimeter (solids basis), after which the solvent was evaporated at 150° F. An adhesive composed of 100 parts of casein, 25 parts of concentrated $NH_4OH$, 510 parts of water, and a small amount of fungicide was roll coated on the pigmented surface and dried at 150° F.

This sheet material was applied and uniformly adhered to a glass surface with the water-activated adhesive by immersing the sheet material in an aqueous ammonia solution having a pH of 11, wetting the surface of the glass with water, and placing the adhesive coated side of the sheet material in contact with the wet glass. Excess water was removed with a squeegee, which was also used to position the sheet material on the glass surface, the low coefficient of friction between the wet glass and the partially dissolved adhesive facilitating this operation. Upon complete drying of the adhesive layer, the sheet material was firmly affixed to the window surface and could be washed and maintained in the usual manner.

The resulting green-tinted windowpane was observed to reduce the direct transmission of ultraviolet light (3400-4000 A.) by 77.5% and infrared light (7500-29,000 A.) by 76.5%. It was also observed that there was a substantial reduction in glare and that images viewed through the windowpane were undistorted. The impact resistance of the glass was increased by over 60%, and no shattering occurred upon failure.

Example 2

One-mil biaxially oriented polyethylene terephthalate film was vapor-coated with a 60-angstrom layer of aluminum, thereby reducing the visible light transmission to 40% of the value for untreated film. Over the aluminum was then applied an 8% solution of 1:1 ethylene terephthalate:ethylene isophthalate copolymer in 1,1,2-trichloroethane, the solution also containing a small amount of an ultraviolet light absorbing agent, and the solvent evaporated to leave a dried coating weighing about 0.8 grain per 24 square inches (about 25,000 angstroms thick). Over the dried copolymer coating was applied a 2½% solids aqueous solution of the neutral ammonium salt of a hydrolyzed 1:1 vinyl methyl ether:maleic anhydride copolymer ("Gantrez AN903"). The water was evaporated to leave an adhesive coating weight of about 0.25 grain per 24 square inches (about 8,000 angstroms thick), after which the structure was subjected to irradiation from a bank of ⅝-inch diameter tubular germicidal lamps positioned ⅝-inch away from the adhesive-coated surface for 35 minutes at 75° F. In accordance with well-known principles the temperature may be increased with a corresponding decrease in irradiation time; for example, 5 watt-minutes per square foot is effective at 180° F.

The copolyester coat of Example 2 is particularly convenient to use and provides outstanding corrosion protection. Increasing the amount of ethylene terephthalate in the copolymer increases toughness but reduces solubility; on the other hand, polyethylene isophthalate can be used per se but is not so tough as is desirable. Protective coats of curable resins, such as epoxy:polyamide resins do not require ultraviolet light irradiation to bond the adhesive coat thereto, but they provide less satisfactory protection against corrosion of the aluminum layer and/or discoloration in the presence of sunlight than the isophthalate polymer of this example.

The sheet material of this example was moistened by passing it through a pan of water (to which methanol may be added as an antifreeze in cold weather) and then applied to the inside surface of a dry window of a closed room, using the same general technique described in the preceding example. Subjective interior illumination was slightly decreased, but not unpleasantly so, and objects outside the window (i.e., on the side of greater light intensity) could be clearly distinguished, even at great distances. The temperature of the room was several degrees lower than that of an identical room having an uncovered window, and subjective reaction was that the temperature difference between the rooms was even greater. The product of this example has the same advantages as that of Example 1, but is superior thereto in certain respects. The adhesive is more uniform, less affected by exposure to sunlight, and can be activated by water alone. The greater amount of vapor-deposited metal also obviates the need for a pigmented coating; this in turn reduces absorption of solar energy and re-radiation of heat to the inside of a protected window.

The water used to activate the adhesive of the products taught herein must pass through the film after it is adhered to a window and would be expected to corrode the extremely thin metallic layer in transit, changing its reflectiveness to transparency. It is believed that this logical but erroneous expectation has dissuaded those skilled in the art from the use of water-activated adhesives in connection with articles of the type taught herein. The efficiency of various prior art products could have been greatly enhanced by adhering them to windows instead of using them as shades, but to the best of applicants' knowledge and belief, such was not done. Surprisingly, however, the products of the preceding examples do not corrode or lose their effectiveness, even over long periods of time. It is not fully understood why this should be true, since it is logical to suppose that the thin protective coating between the adhesive and the metallic layer could not prevent escaping moisture from corroding the minute amount of metal present.

Example 3

A product was prepared identical to that of Example 2 except that the metal vapor-deposited layer was about 100 angstroms thick and the visible light transmission was about 25% of the value for an uncoated film. When this product was laminated to ⅛" sheet glass, the laminate had a shading coefficient, as determined by a solar calorimeter, of 0.33, whereas a similar laminate formed using the product of Example 2 had a shading coefficient of 0.50. The shading coefficient, as used by the American Society of Heating, Refrigerating, and Air Conditioning Engineers (ASHRAE) is the ratio, at a 45° incident angle, of heat transmitted by the laminate to heat transmitted by the glass alone.

Products of the type described in the preceding examples may be expected to remain in place indefinitely, with no significant change in their desirable attributes. They may be removed by applying a layer of wet absorbent paper over the exposed surface of the film for about 20 minutes, and then readily stripping the sheet material from the window.

In describing our invention we are aware that many others have conducted research in this area. Illustrative of such work is Lion U.S. Patent 2,774,421, which describes the preparation of a light transmitting window shade wherein a transparent film is provided with a metallic coating which may be varnished or lacquered to retard oxidation. An even earlier illustration of the broad concept of using semi-transparent mirrors is shown in Frank U.S. Patent 2,106,889, which describes a celluloid sheet coated with a thin metallic silvery material. We are also aware that it is even older to deposit a thin film of metal on the surface of a piece of glass used as a welder's face shield; see, e.g., Pfund U.S. Patent 1,176,313. We likewise neither make claim for the novelty of the individual components per se which make up the product of our invention, nor assert inventorship of such admittedly old products as metal vapor-coated pressure-sensitive adhesive tape of the type shown in Palmquist et al. U.S. Patent 3,152,950.

What we claim is:

1. A heat-reflective, rigid, transparent laminated windowpane comprising a glass panel forming the outermost surface of the windowpane, a flexible sheet material forming the innermost surface of the windowpane, and a water-activatable adhesive uniformly joining the panel and sheet material throughout their coextensive areas, said sheet material comprising a thin flexible transparent polymeric film having on the side adjacent the glass panel a transparent reflective aluminum deposit which is contacted and protectively covered by a thin, transparent water-insoluble moisture-transmitting coating, whereby at least about half of the sun's rays in the infrared and ultraviolet regions are reflected by the metal deposit and the ability to see through the windowpane from the side looking toward the area of greatest light intensity is only slightly impaired.

2. A heat-reflective, rigid, transparent laminated windowpane comprising a glass panel forming the outermost surface of the windowpane, a flexible sheet material forming the innermost surface of the windowpane, and a water-activatable adhesive uniformly and firmly bonding the panel and sheet material together throughout their coextensive areas, said sheet material comprising a thin flexible transparent polymeric film having on the side adjacent the glass panel a transparent reflective aluminum deposit on the order of 25–125 angstroms thick, and a thin, transparent moisture transmitting water-insoluble protective layer between the aluminum deposit and the adhesive.

3. A thin, flexible transparent reflective sheet material adapted for use as a covering for glass surfaces to reduce glare and heat normally transmitted through windowpanes, comprising an optically clear flexible polymeric film backing having on one surface a transparent reflective aluminum coating on the order of 25 to 125 angstroms thick, a transparent moisture transmitting water-insoluble protective organic coating uniformly contacting and firmly bonded to said aluminum coating, and a transparent water-activatable adhesive layer uniformly contacting and firmly bonded to said protective coating.

4. The product of claim 3 wherein the polymeric film backing is biaxially oriented polyethylene terephthalate.

5. The product of claim 4 wherein the protective organic coating is a trichloroethane soluble polymer of ethylene isophthalate.

6. The product of claim 5 wherein the soluble polymer is a 1:1 ethylene terephthalate:ethylene isophtahlate copolymer.

7. A thin, flexible transparent reflective sheet material adapted for use as a covering for glass surfaces to reduce glare and heat normally transmitted through windowpanes, comprising an optically clear biaxially oriented polyethylene terephthalate film on the order of 0.5 to 2 mils thick and having on one surface thereof a transparent reflective aluminum coating on the order of 25 to 125 angstroms thick, a layer of moisture transmitting trichloroethane soluble ethylene isophthalate polymer on the order of at least 10,000 angstroms thick contacting and firmly bonded to said aluminum coating, and a layer of an adhesive, consisting essentially of the neutral ammonium salt of a water-soluble hydrolyzed vinyl methyl ether: maleic anhydride copolymer, contacting and firmly bonded to said layer of ethylene isophthalate polymer.

8. A thin, flexible transparent reflective sheet material adapted for use as a covering for glass surfaces to reduce the transmission of solar energy therethrough, comprising a strong, clear flexible film having on one surface thereof a transparent reflective aluminum coating which reduces light transmission through said film to about 10–80% of its uncoated value, a thin, transparent moisture transmitting water-insoluble protective layer firmly bonded to the surface of said aluminum coating, and a thin, transparent layer of water-activatable vinyl ethyl polymer firmly bonded to the surface of said protective layer.

9. A thin, transparent reflective sheet material adapted for use as a covering for window panes to reduce glare and heat normally transmitted therethrough, comprising an optically clear film of biaxially oriented polyethylene terephthalate having on one surface a transparent reflective vapor-deposited aluminum layer, a moisture-transmitting trichloroethane-soluble water-insoluble protective coating at least about 10,000 angstroms thick uniformly contacting and firmly bonded to said aluminum layer, said coating consisting essentially of a copolymer of ethylene terephthalate and ethylene isophthalate, and a transparent water-activatable adhesive layer uniformly contacting and firmly bonded to said coating.

10. A thin transparent reflective sheet material adapted for use as a covering for window panes to reduce glare and heat normally transmitted therethrough, comprising an optically clear film of biaxially oriented polyethylene terephthalate having on one surface a transparent reflective vapor-deposited aluminum layer, a moisture-transmitting trichloroethane-soluble water-insoluble protective coating at least about 10,000 angstroms thick uniformly contacting and firmly bonded to said aluminum layer, said coating consisting essentially of a copolymer of ethylene terephthalate and ethylene isophthalate, and a transparent water-activatable adhesive layer uniformly contacting and firmly bonded to said coating, said adhesive consisting essentially of the neutral ammonium salt of a water-soluble hydrolyzed vinyl methyl ether:maleic anhydride copolymer.

References Cited by the Examiner

UNITED STATES PATENTS

| | | | |
|---|---|---|---|
| 2,675,740 | 4/1954 | Barkley | 117—107 |
| 2,702,580 | 2/1955 | Bateman | 161—214 |
| 2,774,421 | 12/1956 | Lion | 161—408 |
| 2,961,365 | 11/1960 | Sroog | 156—332 |
| 3,069,301 | 12/1962 | Buckley et al. | 161—409 |
| 3,118,781 | 1/1964 | Downing | 161—408 |

OTHER REFERENCES

Modern Plastics Encyclopedia (September 1957), vol. 35–1A (p. 170).

JACOB H. STEINBERG, *Primary Examiner.*

ALEXANDER WYMAN, W. J. VAN BALEN,
*Assistant Examiners.*

UNITED STATES PATENT OFFICE
CERTIFICATE OF CORRECTION

Patent No. 3,290,203　　　　　　　　　　　　　　December 6, 1966

David L. Antonson et al.

It is hereby certified that error appears in the above numbered patent requiring correction and that the said Letters Patent should read as corrected below.

Column 6, line 23, for "ethyl" read -- ether --.

Signed and sealed this 7th day of November 1967.

(SEAL)
Attest:

Edward M. Fletcher, Jr.
Attesting Officer

EDWARD J. BRENNER
Commissioner of Patents